US006862772B2

(12) United States Patent
Weiler

(10) Patent No.: US 6,862,772 B2
(45) Date of Patent: Mar. 8, 2005

(54) WIPER ARM

(75) Inventor: Michael Weiler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 10/240,554

(22) PCT Filed: Dec. 6, 2001

(86) PCT No.: PCT/DE01/04608
§ 371 (c)(1),
(2), (4) Date: Oct. 1, 2002

(87) PCT Pub. No.: WO02/064406
PCT Pub. Date: Aug. 22, 2002

(65) Prior Publication Data
US 2003/0101530 A1 Jun. 5, 2003

(30) Foreign Application Priority Data
Feb. 10, 2001 (DE) .......................................... 101 06 235

(51) Int. Cl.[7] .............................. B60S 1/32; B60S 1/34
(52) U.S. Cl. ............................. 15/250.351; 15/250.352
(58) Field of Search ..................... 15/250.351, 250.352, 15/250.34, 250.202

(56) References Cited

U.S. PATENT DOCUMENTS 2,749,158 A * 6/1956 Smulski ...................... 403/106
3,022,531 A * 2/1962 Scinta .................... 15/250.352
3,665,544 A * 5/1972 Sakamoto ................ 15/250.32
5,502,867 A * 4/1996 Egner-Walter ......... 15/250.352
6,038,728 A * 3/2000 Terai et al. ............. 15/250.201

FOREIGN PATENT DOCUMENTS

| DE | 198 33 488 A | 1/1999 | |
| DE | 199 03 140 A1 | 8/1999 | |
| EP | 1 033 295 A | 9/2000 | |
| GB | 777094 * | 6/1957 | ............ 15/250.351 |
| WO | 99 38736 A | 8/1999 | |

OTHER PUBLICATIONS

Patent Abstracts of Japan vol. 2000, No. 05, Sep. 14, 2000 & JP 2000 062575 A, Feb. 29, 2000.

* cited by examiner

Primary Examiner—Gary K. Graham
(74) Attorney, Agent, or Firm—Michael J. Striker

(57) ABSTRACT

The invention is based on a wiper arm (10) that is comprised of a mounting part (12) and an articulating part (14), which is pivotably connected to a first region (16) of the mounting part (12) by means of a hinge joint (22) and has a wiper rod (24), to which a wiper blade is pivotably connected, wherein the mounting part (12) is securely affixed with a second region (18) to a drive shaft (20) and braced in relation to the articulating part (14) by means of a tension spring (28). The invention proposes that the mounting part (12) have a device (34, 36, 42), which permits the first region (16) of the mounting part (12) oriented toward the articulating part (14) to collapse toward a vehicle windshield in a defined manner.

6 Claims, 5 Drawing Sheets

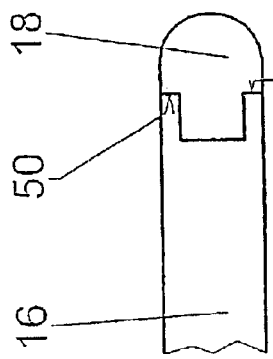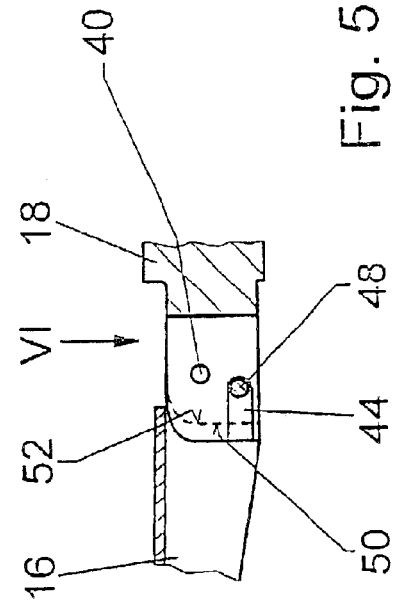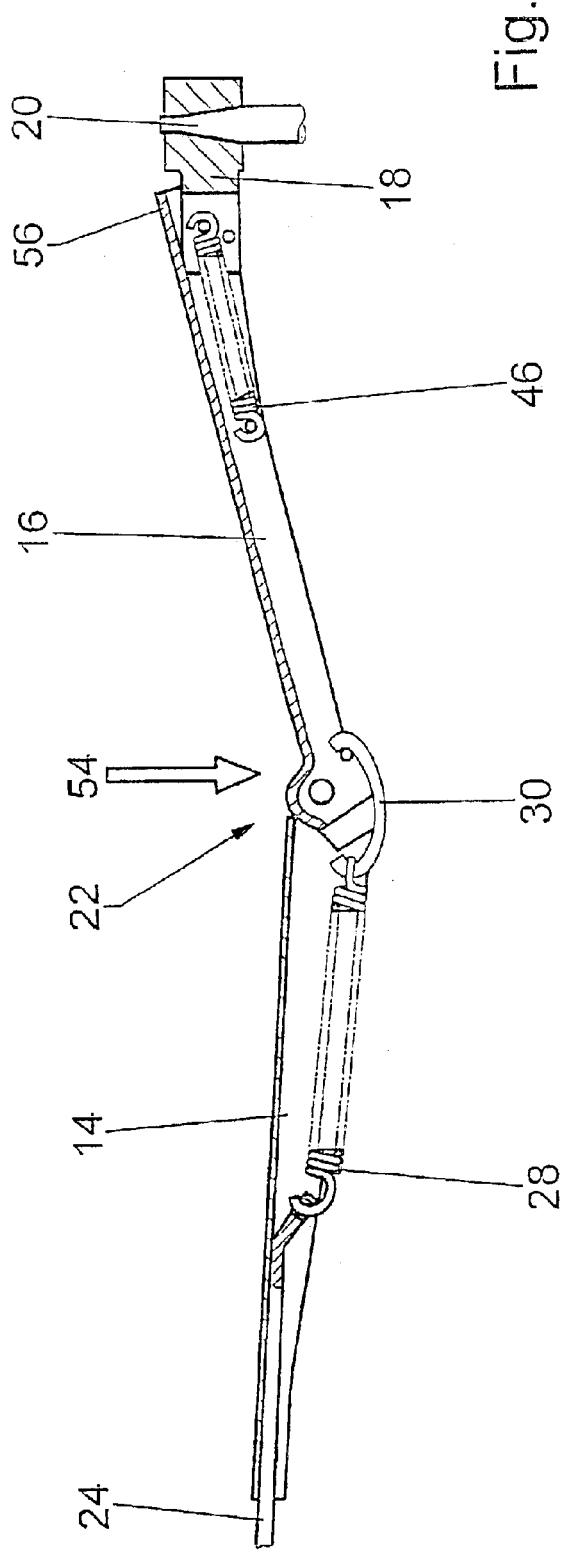

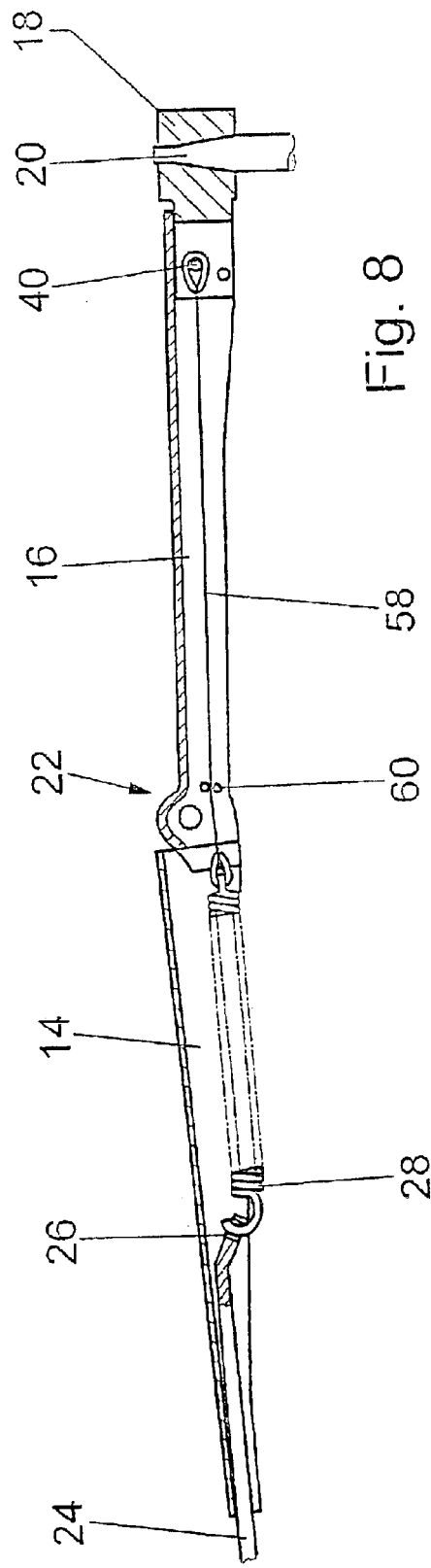
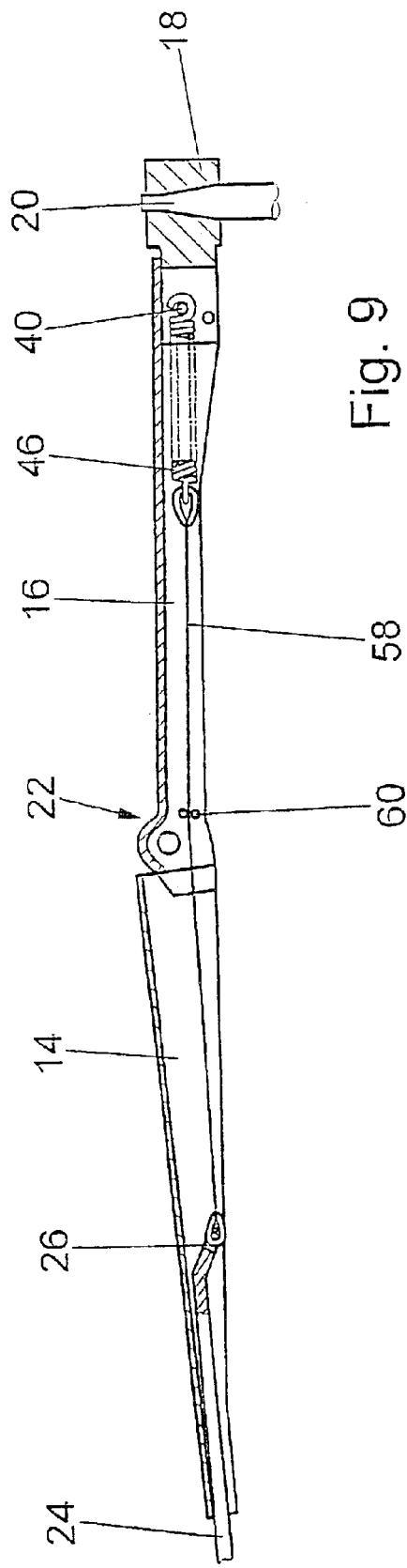
Fig. 8
Fig. 9

WIPER ARM

BACKGROUND OF THE INVENTION

The invention relates to a wiper arm.

Known windshield wipers have a wiper arm that is comprised of a mounting part and an articulating part pivotably connected to it, which has a wiper rod. The wiper rod has a wiper blade pivotably connected to it, which is comprised of a wiper strip and a support bracket system with a primary center bracket and pivotably connected secondary intermediate brackets and claw brackets.

The articulating part has a spring chamber for a tension spring at its end oriented toward the mounting part. The spring chamber is open toward the vehicle windshield and has a slot-shaped extension, which is oriented toward the wiper rod and has a first anchor point on which a securing bracket of the tension spring is suspended. The other end of the tension spring is provided with a C-shaped bracket, which is suspended on a suspension device of the mounting part; this suspension device serves as the second anchor point. The articulating part is also supported by means of a hub on a bolt-shaped hinge pin, which is disposed in a first region of the mounting part oriented toward the articulating part. The joint thus produced, also called a hinge joint, and the suspension device of the tension spring, are disposed in relation to each other so that the tension spring pulls the articulating part and the wiper rod with the wiper blade toward a vehicle windshield.

The articulating part of the windshield wiper is folded away from the vehicle windshield for cleaning or installation of the wiper blade. To this end, the articulating part is pivoted around the hinge pin of the hinge joint, during which the tension spring assumes a position in which it pulls the articulating part against a stop, which is supported on the mounting part and limits the pivoting motion.

A second region of the mounting part is mounted on the free end of a drive shaft, which is supported in a wiper bearing and driven by a wiper motor by means of a crank and a rod assembly. The wiper motor is held in place by a mounting plate, which is mounted on the vehicle body and which contains wiper bearings. Frequently, the wiper bearings themselves serve as anchor points by passing through openings in the vehicle body and being screwed into the vehicle body with the interposition of vibration-damping rubber elastic elements.

The end of the drive shaft protruding from the vehicle body represents a significant danger source for injuries during accidents with pedestrians. With regard to accidents with pedestrians, European Commission outlines for crash regulations (EC III/5021/96 EN) define maximum acceleration values, so called head injury criteria, in the vicinity of the vehicle hood and the wiper system. These criteria cannot be met with conventional wiper systems, even if the vehicle hood overlaps the drive shaft, because in this case, too, there is no assurance that the vehicle hood and the drive shaft are far enough apart, particularly with tight hood clearances.

One possible solution for this is to shift the end of the drive shaft further into the engine compartment. Vehicle manufacturers require a minimum distance of 65–85 mm between vehicle hood and the end of the drive shaft. This also increases the distance from this drive shaft end to the articulating part, requiring a longer mounting part. Besides, at least during wiping, the mounting part still protrudes into the region a pedestrian would strike during impact.

A wiper system with a moveable drive shaft is disclosed in DE 198 03 344 A1. According to this reference, the protruding end of the drive shaft is shifted into the vehicle body when an axial force of a predetermined magnitude acts on the end of the drive shaft from the outside. In order to cushion the impact, means are provided between an inwardly oriented stop of the drive shaft and a part permanently connected to the vehicle body or between such a part and the vehicle body; these means plastically and/or elastically deform when acted on in the axial direction by a critical axial force, causing the end of the drive shaft to move into the engine compartment in a defined manner. These means can be comprised of a plastically deformable sheet metal sleeve, which suitably has a region that is corrugated in the axial direction of the axis, or can be comprised of thin-walled, disk-shaped elements, which, depending on the displacement distance, can be disposed operatively in series. These elements can have such a small amount of play in relation to the drive shaft or to other adjacent components that when they deform, they come into contact with these components and through friction, increase the cushioning action. Finally, the means can be disposed so that they are compressed or stretched apart when subjected to the critical axial force. The drive shaft can also be axially secured to the bearing housing of the wiper bearing by means of form-fitting elements with a predetermined breaking point, which break or bend into available space when subjected to a critical axial force. Predetermined breaking points of this kind can be created by means of notches, bores, or shearing pins. Aside from the fact that some embodiments of this principle are very complex structurally, the principle is also only effective if the impact occurs in the vicinity of the end of the drive shaft.

SUMMARY OF THE INVENTION

According to the invention, the mounting part of a wiper drive has a device, which allows a first region of the mounting part oriented toward the articulating part to collapse toward the vehicle windshield in a defined manner. In the event of an impact, e.g. by the head of a pedestrian, the wiper arm immediately yields in the vicinity of the mounting part and the articulating part. In this case, the pedestrian who has been struck does not hit a fixed obstacle, which reduces the risk of injury.

In one embodiment of the invention, a predetermined breaking point of the mounting part constitutes the collapsing device of the wiper arm. This predetermined breaking point is suitably designed as a notch and/or perforation in the side walls of the mounting part and is disposed at the end oriented toward the drive shaft. One or more notches and/or perforations weaken the cross section of the mounting part in the direction of the impact so that, during impact on the wiper arm with a correspondingly powerful force, the mounting part is designed to break at this point and the wiper arm is pushed against the vehicle windshield. Following an accident the wiper arm must be replaced anyway. It is advantageous that this embodiment can be produced with little structural expense and requires no additional parts. However, it can also be applied to other known measures since it is also effective when the impact occurs at a distance from the drive shaft and a movement of the drive shaft is hindered by tilting moments.

In one additional variant, the collapsing device is designed as a joint that connects the second region of the mounting part, which is permanently connected to the drive shaft and is embodied as a separate component, to a first region, which is also embodied as a separate component. The pivoting motion of the joint is limited in the folding direction by a stop. This stop supports the contact force of the wiper arm, which is exerted by a tension spring against the vehicle windshield and prevents the mounting part from yielding when the wiper folds down. During an impact against the first part of the mounting part in direction toward the vehicle windshield, the first part of the mounting part yields by tilting around the axis of the joint. To compensate for the weight of the joint and the wiper parts connected to it when the wiper arm is in a folded position, a spring in the form of a tension spring is suitably provided, whose line of action extends between the hinge pin and the stop and acts on the two components of the mounting part.

In order to embody a transport position and folded position in a more stable fashion, it is advantageous to embody the joint as a latch joint, in which the initial tension of the spring increases starting from a latched position, which corresponds to the operating and transport position, when the first part is pivoted in relation to the second part. This can be accomplished by disposing the anchor point of the spring on the second part so that it is offset toward the drive shaft in relation to the hinge pin. In addition, latch surfaces or latch cams can be provided, which are accordingly embodied on either end in relation to the line of action of the spring in the latched position.

In one variant, the joint has a hub formed onto a part of the mounting part, with a bearing bore, which is embodied as an oblong hole extending in longitudinal direction of the mounting part and is engaged by a hinge pin, which is formed onto the second part of the mounting part. The oblong hole can be open toward the mounting part to allow for easier installation. During operation, the two parts support each other by means of the hinge pin and the stop and are held in this position by the spring. The initial tension of the spring assures that the preassembled components of the mounting part do not fall apart during transport. If a critical impact force is applied to the wiper arm, then the spring force is overcome and the first part of the mounting part collapses toward the vehicle windshield. The collapsed region of the mounting part also causes the hinge joint to fold back slightly from the operating position. This variant has the advantage that the operating position of the wiper arm can be very easily restored by the two joints being folded back into their starting position or by virtue of the fact that they fold back into it automatically. A prerequisite for this is that the parts of the wiper arm as a whole have not been damaged by the impact.

Since the latch joint and the hinge joint have a similar function and are braced by means of a tension spring, according to one embodiment of the invention, only one shared tension spring is provided for both joints, which is secured by means of a cable between a first anchor point on the articulating part and a second anchor point on the first part of the mounting part. The tension spring can be associated with the mounting part or the articulating part. In addition, this embodiment can be produced without the C-shaped bracket of the hinge joint so that less space is required between the wiper arm and the vehicle windshield.

Basically, all variants of the invention provide protection from injury in the entire range of motion and in the parked position of the wiper. In addition, the basic, proven design of the wiper arm can remain unchanged. The same is true of the manufacturing process for producing the wiper arm. The modifications according to the invention to the individual parts of the wiper arm require only a small amount of additional effort, e.g. the adaptation of the injection molds or bending tools.

Additional advantages ensue from the following description of the drawings. Exemplary embodiments of the invention are shown in the drawings. The drawings, the description, and the claims contain numerous features in combination. One skilled in the art will naturally also consider the features individually and unite them in other meaningful combinations.

BRIEF DESCRIPTION OF THE DRAWINGS

Figure 1:
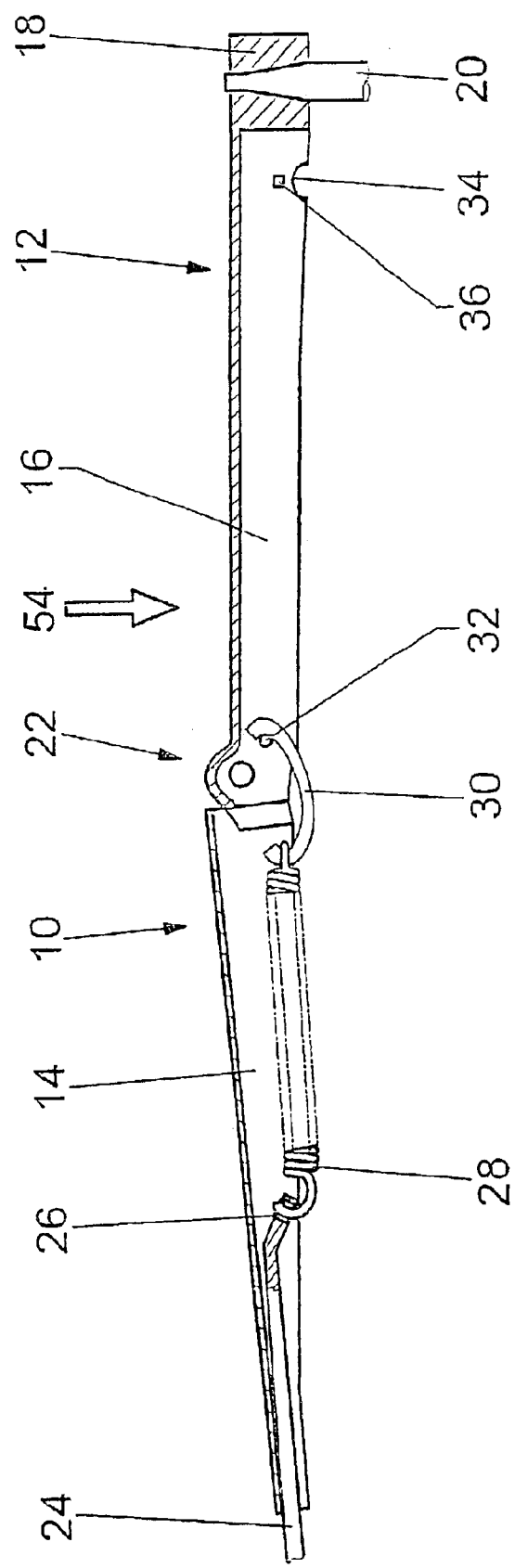
Figure 2:
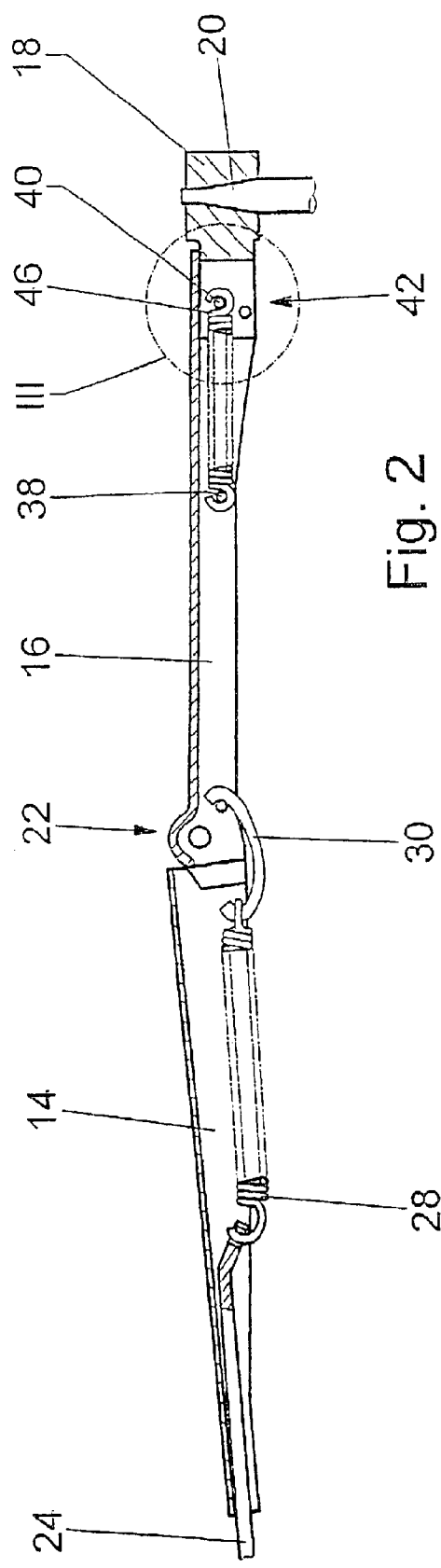
Figure 4:
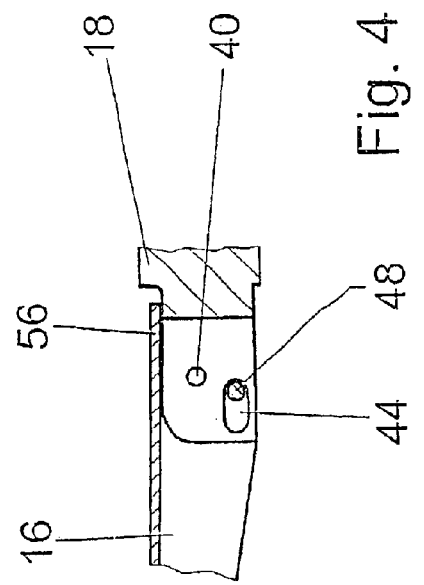
Figure 3:
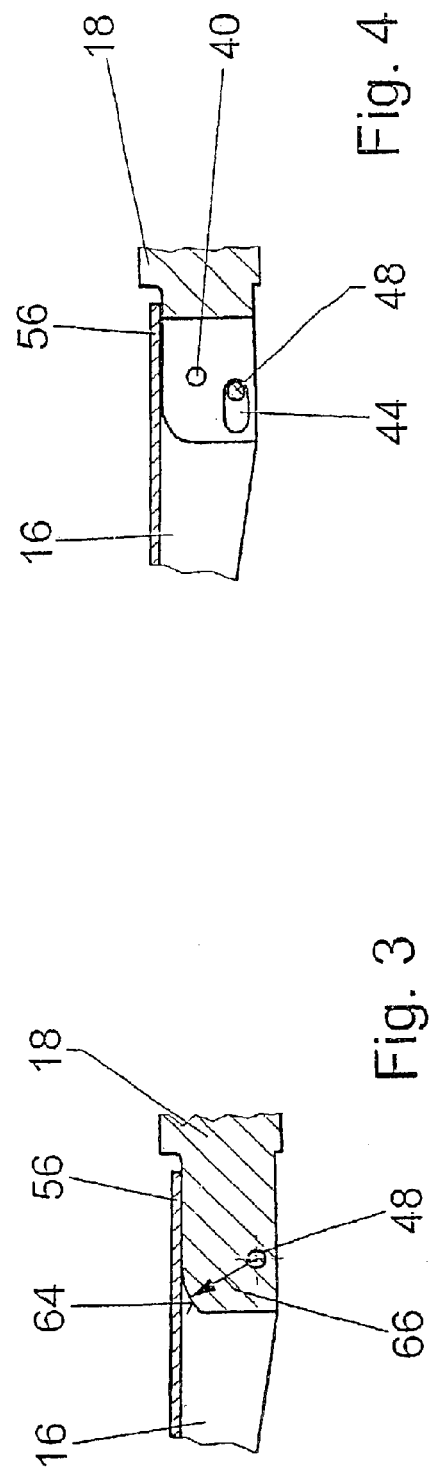
Figure 10:
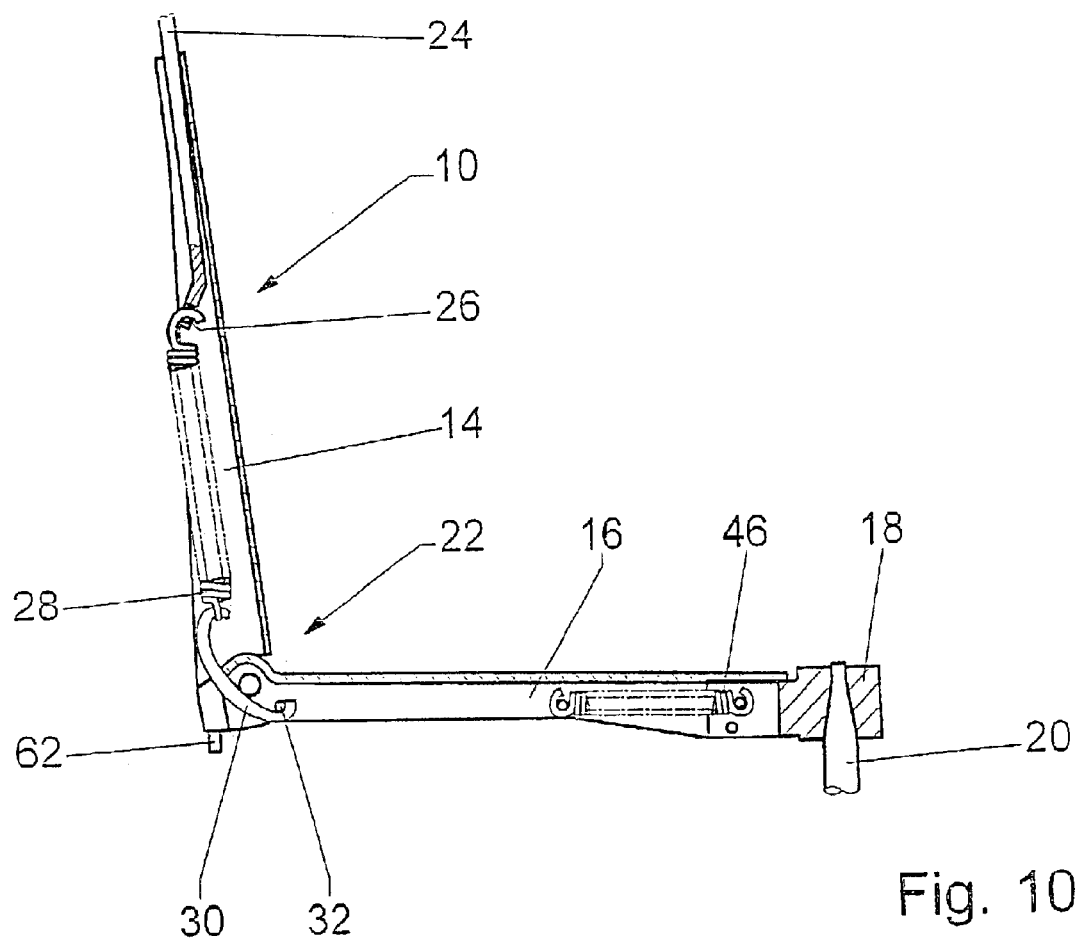

| | |
|---|---|
| FIG. 1 | shows a longitudinal section through a wiper arm in the operating position, |
| FIG. 2 | shows a variant of FIG. 1, |
| FIG. 3 | shows an enlargement of a detail III of FIG. 2, without a spring, |
| FIG. 4 | shows a variant of FIG. 3, with a spring, |
| FIG. 5 | shows another variant of FIG. 3, with a spring, |
| FIG. 6 | shows a top view according to an arrow VI in FIG. 5, |
| FIG. 7 | shows a longitudinal section through a wiper arm in a buckled position, |
| FIGS. 8–9 | show variants of FIG. 1, |
| FIG. 10 | shows a longitudinal section through a wiper arm in the position for replacing a wiper blade. |

DESCRIPTION OF THE PREFERRED EMBODIMENTS

A wiper arm 10 is basically comprised of a mounting part 12 and an articulating part 14 with a wiper rod 24 (FIG. 1). A wiper blade, not shown in detail, is connected pivotably to the free end of the wiper rod 24. The articulating part 14 is connected to the mounting part 12 by means of a hinge joint 22. In the operating position shown, the two parts are braced in relation to each other by means of a tension spring 28. One end of the tension spring 28 is suspended in an eye 26 on the articulating part 14 and at the other end, is suspended on a pin 32 on mounting part 12 by means of a C-shaped bracket 30.

The mounting part 12 of the wiper arm 10 is securely affixed to the free end of a drive shaft 20. Close to the drive shaft 20, the mounting part 12 has a notch 34 and a perforation 36 in the side walls of its U-shaped profile. The notch and perforation weaken the cross section so that, in the event of an accident in which a person is struck, the cross section functions as a predetermined breaking point and the mounting part 12 yields easily and/or breaks at this point in the direction of the impact force 54. In this connection, the size and number of the notches 34 and perforations 36 are selected so that the mounting part 12 does not break under normal conditions, even when under stress from the weight of snow. The predetermined breaking point marked by the notch 34 and the perforation 36 divides the mounting part 12 into a first region 16, which is oriented toward the articulating part 14 and which collapses on impact, and a second region 18, which is mounted to the drive shaft 20.

In one embodiment of the invention, the device for the defined collapsing of the mounting part 12 is constituted by a joint 42 (FIG. 2). This joint connects the first collapsing region 16 of the mounting part 12, which is embodied as a separate component, to the second region 18, which is securely affixed to the drive shaft 20 and which is also embodied as a separate component. A stop 56 limits the pivoting motion of the joint 42 in the folding direction, but allows it to freely pivot toward the vehicle windshield, during which the end of the first part 16 of the mounting part 12, which comprises the stop 56, follows an arc-shaped contour 64 with a radius 66 around the hinge pin 48. In the operating position of the wiper arm 10, the force of the tension spring 28 presses the first part 16 with the stop 56 against the second part 18 and thereby converts the recoil force into the force of the wiper arm 10 acting on the drive shaft 20. In order to compensate for the weight of the articulating part 14 and the parts of the windshield wiper connected to it in the folded position (FIG. 10) and in order to keep the mounting part 12 extended in this position, a spring 46 is suitably provided, one end of which is suspended on a pin 38 of the first part 16 and the other end of which is suspended on a pin 40 of the second part 18 (FIG. 2). The line of action of the spring 46, which is embodied as a tension spring, extends between the stop 56 and the hinge pin 48 so that a stable balance is achieved.

The stability of the position can be improved by embodying the joint 42 as a latch joint whereby the initial tension of spring 46 increases significantly in the pivoting direction on both sides of the latched position, as the distance between the pins 38, 40 increases. This can be achieved by disposing the pin 40 on the second part accordingly in relation to the hinge pin 48, e.g. by offsetting it toward the drive shaft 20. In another possible embodiment, the parts 16, 18 are supported against each other by means of the latch surfaces 50, 52 or latch cams, which shift the parts 16, 18 in relation to each other during the pivoting motion, during which the hinge pin 48 can move in a hub, which is embodied as a cross sectionally oblong hole (FIG. 4). The oblong hole 44, which extends in longitudinal direction of the mounting part 12, can be open toward the articulating part 14 in order to facilitate installation (FIG. 5). The latch surfaces 50, 52 can be embodied at any suitable position between the first and second parts 16, 18, e.g. in the end region of the side walls of the cross sectionally U-shaped profile of the first part 16 (FIGS. 5 and 6).

During an impact, an impact force 54 acts on the mounting part 12, causing the first part 16 of the mounting part 12 to collapse. In the course of this, the hinge pin 48 functions as the rotation axis and the first part 16 slides along the latch surfaces 50, 52, whereby the initial tension of spring 46 is initially increased. The wiper arm 10 finally comes to rest in the position shown in FIG. 7. The impact force 54 also causes the articulating part 14 to fold out from the extended operating position. A corresponding dimensioning of the tension spring 28 assures that the articulating part 14 does not completely fold upward into the folded position (FIG. 10).

After an impact, both joints 22, 42 can be reset. In the course of this, the end of the U-shaped profile of the first part 16 of the mounting part 12 oriented toward the drive shaft 20 constitutes a stop 56. The stop 56 prevents the first part 16 from collapsing, on the one hand due to the contact force of the windshield wiper and on the other hand, when the articulating part 14 folds outward.

In another embodiment of the invention, the hinge joint 22 and the latch joint 42 are provided with a common tension spring 28 or 46 that is mounted by means of a cable between the eye 26, which functions as a first anchor point on the articulating part 14, and the pin 40, which functions as a second anchor point on the second part 18, (FIG. 8 and FIG. 9). The cable 58 is guided between two guide elements 60 on the mounting part 12 in the vicinity of the hinge joint 22.

FIG. 10 shows the articulating part 14 folded upward almost perpendicular so that a wiper blade, not shown in this drawing, which is pivotably connected to the wiper rod 24, can be replaced. In this position, an elastic stop 62, e.g. a rubber bumper, which is disposed in the vicinity of the hinge joint 22 at the end of the articulating part 14, suitably prevents the first part 16 of the mounting part 12 from inadvertently striking against the vehicle windshield.

What is claimed is:

1. A wiper arm (10) that is comprised of a mounting part (12) and an articulating part (14), which is pivotably connected to a first region (16) of the mounting part (12) by means of a hinge joint (22) and has a wiper rod (24), to which a wiper blade is pivotably connected, wherein the mounting part (12) is securely affixed with a second region (18) to a drive shaft (20) and braced in relation to the articulating part (14) by means of a tension spring (28), wherein the first and second regions (16,18) are separate components, wherein the mounting part (12) has a device (34,36,42) connecting the regions, the device is embodied as a second joint (42) whose pivoting motion in a folding direction is limited by a stop (56), the device permits the first region (16) of the mounting part (12) oriented toward the articulating part (14) to collapse toward a vehicle windshield in a defined manner, wherein a second spring (46) presses the first region (16) against a stop (56) in an operating position and is designed so that it supports a weight of the wiper arm (10) in a folded position of the wiper arm (10).

2. The wiper arm (10) according to claim 1, wherein the second spring (46) is a tension spring.

3. A wiper arm (10) that is comprised of a mounting part (12) and an articulating part (14), which is pivotably connected to a first region (16) of the mounting part (12) by means of a hinge joint (22) and has a wiper rod (24), to which a wiper blade is pivotably connected, wherein the mounting part (12) is securely affixed with a second region (18) to a drive shaft (20) and braced in relation to the articulating part (14) by means of a tension spring (28), wherein the first and second regions (16,18) are separate components, wherein the mounting part (12) has a device (34,36,42) connecting the regions, the devices is embodied as a second joint (42) whose pivoting motion in a folding direction is limited by a stop (56), the device permits the first region (16) of the mounting part (12) oriented toward the articulating part (14) to collapse toward a vehicle windshield in a defined manner, wherein a second spring (42) has a hub with a bearing bore, which is embodied in longitudinal direction of the mounting part (12) as a cross sectionally oblong hole (44) and which engages in hinge pin (48), wherein the parts (16, 18) of the mounting part (12) supports each other in an operating position by means of latch surfaces (50, 52) and/or the hinge pin (48) and a stop (56).

4. The wiper arm (10) according to claim 3, wherein the oblong hole (44) is open toward the articulating part (14).

5. A wiper arm (10) that is comprised of a mounting part (12) and an articulating part (14), which is pivotably connected to a first region (16) of the mounting part (12) by means of a hinge joint (22) and has a wiper rod (24), to which a wiper blade is pivotably connected, wherein the mounting part (12) is securely affixed with a second region (18) to a drive shaft (20) and braced in relation to the articulating part (14) by means of a tension spring (28), wherein the first and second regions (16,18) are separate components, wherein the mounting part (12) has a device (34,36,42) connecting the regions, the device is embodied as a second joint (42) whose pivoting motion in a folding direction is limited by a stop (56), the device permits the first region (16) of the mounting part (12) oriented toward the articulating part (14) to collapse toward a vehicle windshield in a defined manner, wherein the hinge joint (22) and the joint (42) are provided with a shared spring (28, 46), which is mounted by means of a cable (58) between a first anchor point (26) on the articulating part (14) and a second anchor point (40) on the second part (18) of the mounting part (12), wherein a cable (58) is guided between two guide elements (60), which extend lateral to a longitudinal direction, on the mounting part (12) in the vicinity of the hinge joint (22).

6. A wiper arm (10) that is comprised of a mounting part (12) and an articulating part (14), which is pivotably connected to a first region (16) of the mounting part (12) by means of a hinge joint (22) and has a wiper rod (24), to which a wiper blade is pivotably connected, wherein the mounting part (12) is securely affixed with a second region (18) to a drive shaft (20) and braced in relation to the articulating part (14) by means of a tension spring (28), wherein the first and second regions (16,18) are separate components, wherein the mounting part (12) has a device (34,36,42) connecting the regions, the device is embodied as a second joint (42) whose pivoting motion in a folding direction is limited by a stop (56), the device permits the first region (16) of the mounting part (12) oriented toward the articulating part (14) to collapse toward a vehicle windshield in a defined manner, wherein an end of the articulating part (14), which is oriented toward the mounting part (12), has an elastic stop (62), which points toward a vehicle windshield in a folded position.

* * * * *